United States Patent [19]

O'Meara, Jr.

[11] Patent Number: 4,564,448

[45] **Date of Patent: * Jan. 14, 1986**

[54] DEVICE FOR TREATING FLUIDS WITH MAGNETIC LINES OF FORCE

[76] Inventor: James R. O'Meara, Jr., P.O. Box 58170-MS-888, Houston, Tex. 77258

[*] Notice: The portion of the term of this patent subsequent to Sep. 15, 1998 has been disclaimed.

[21] Appl. No.: 555,799

[22] Filed: Nov. 28, 1983

Related U.S. Application Data

[63] Continuation-in-part of Ser. No. 301,696, Sep. 14, 1981, Pat. No. 4,417,984, which is a continuation-in-part of Ser. No. 151,864, May 21, 1980, Pat. No. 4,289,621.

[51] Int. Cl.[4] .......... B01D 35/06; B03C 1/02

[52] U.S. Cl. .......... 210/222; 55/100; 210/695

[58] Field of Search .......... 210/222, 223, 695; 209/223 R, 232; 55/3, 100

[56] References Cited

U.S. PATENT DOCUMENTS

| | | | |
|---|---|---|---|
| 2,825,464 | 3/1958 | Mack | 210/222 |
| 3,228,868 | 1/1966 | Ruskin | 210/222 |
| 3,371,790 | 3/1968 | Kudlaty et al. | 210/223 |
| 3,680,705 | 8/1972 | Happ et al. | 210/222 |
| 3,923,660 | 12/1975 | Kottmeier | 210/222 |
| 3,951,807 | 4/1976 | Sanderson | 210/222 |
| 4,176,065 | 11/1979 | Cook | 210/223 |
| 4,289,621 | 9/1981 | O'Meara, Jr. | 210/222 |
| 4,417,984 | 11/1983 | O'Meara, Jr. | 210/223 |
| 4,455,229 | 6/1984 | Sanderson et al. | 210/222 |

*Primary Examiner*—Richard V. Fisher
*Assistant Examiner*—W. Gary Jones
*Attorney, Agent, or Firm*—Finnegan, Henderson, Farabow, Garrett & Dunner

[57] ABSTRACT

A device and method for the treatment of a fluid with magnetic lines of force are disclosed. The device comprises a core magnet assembly and at least one spaced-apart and concentric elongated ring magnet assembly forming at least one annular passageway for said fluid. Each magnet assembly comprises at least one tier of at least two magnetic sections arranged in coaxial lines in N—N and S—S relation in at least one permanent magnet. The ends of each tier of magnetic sections are supported by support members and, when said tier contains more than one magnet, the length of said tier is supported between its ends. The magnet assemblies are positioned so that the polarities of adjacent polar ends of magnetic sections in one of said magnet assemblies are unlike the polarities of the oppositely disposed adjacent polar ends of magnetic sections in a spaced-apart magnet assembly. The device and method are effective to reduce or inhibit the formation of undesired precipitates such as scale in a system in which the treated fluid is used.

19 Claims, 13 Drawing Figures

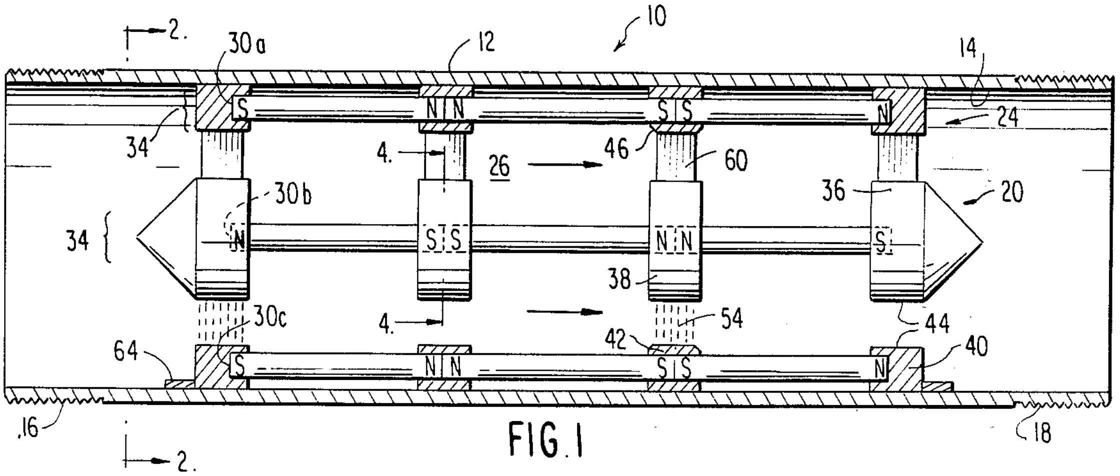
FIG. 1
FIG. 2
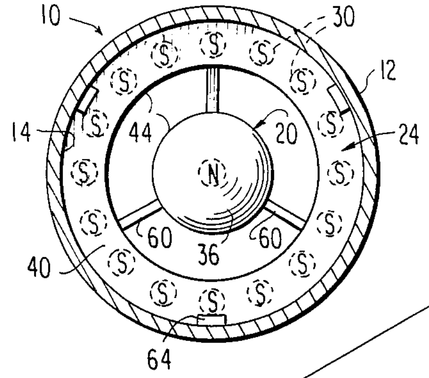
FIG. 3
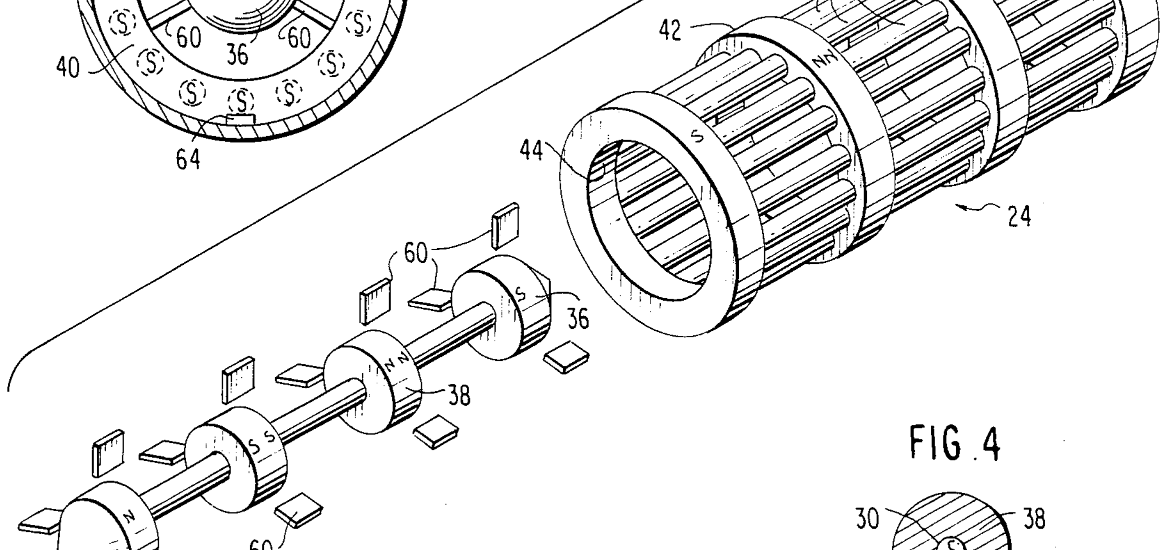
FIG. 4
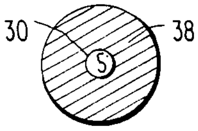
FIG. 4C
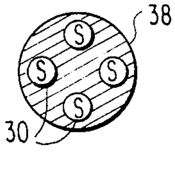
FIG. 4B
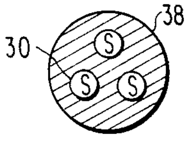
FIG. 4A
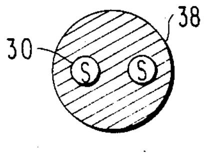

DEVICE FOR TREATING FLUIDS WITH MAGNETIC LINES OF FORCE

The present application is a continuation-in-part of my copending U.S. patent application Ser. No. 301,696 filed Sept. 14, 1981, now U.S. Pat. No. 4,417,984 which is, in turn, a continuation-in-part of my U.S. patent application Ser. No. 151,864 filed May 21, 1980, now U.S. Pat. No. 4,289,621.

The present invention relates to a method and device for the treatment of fluids by magnetic lines of force. More particularly, the present invention relates to a method and device for the magnetic treatment of liquids with concentrated high flux intersects. For example, the method and device of the present invention may be utilized for the treatment of aqueous liquids which contain scale minerals with said concentrated high flux intersects to reduce or inhibit the formation of scale in an aqueous liquid system. In another embodiment, the present invention may be utilized for the treatment of fluid hydrocarbons such as crude oil, drilling muds or oil-based fluids to inhibit formation therein of solid hydrocarbons such as a paraffin and/or to remove preformed/or formative particles therefrom.

For many years, methods and devices and/or systems have been proposed which utilize the force fields of permanent magnets for the treatment of liquids and particularly aqueous liquids to reduce or eliminate the precipitation of calcium salts, magnesium salts and other mineral compounds therefrom and the adherence of the resulting precipitate as scale on heat transfer surfaces in boilers, heat exchangers and the like. Many attempts have been made to propose theories explaining the effect of the magnetic phenomena on these and other impurities contained in an aqueous liquid or other fluid. However, conclusive scientific evidence regarding the effect of the phenomena is minimal. It has been theorized that the effect of the magnetic field in reducing the formation of scale appears to be related to the onset of bulk crystallization of scale minerals upon a large number of microscopic nucleating centers that are formed when a fluid such as an aqueous liquid containing moderate to supersaturated proportions of scale salts flows through a magnetic field.

Even in the absence of conclusive evidence and explanation, numerous methods and devices have been proposed in the recent past for the purpose of treating water and other liquids in order to reduce and in some cases eliminate the need for added chemical dispersants and/or coagulants. These methods and devices have had varying degrees of success depending on their design and/or the understanding by the designer of magnetic principles and applications. Generally, the magnetic treatment of an aqueous liquid results in causing the materials that ordinarily form scale contained therein to form, instead, a loose slurry or sludge-like substance which can be easily removed from the aqueous liquid system by simple blowdown or flushing.

The methods and devices proposed to date are generally either of a complicated nature and expensive to use or fabricate or are of minimal effect in reducing the formation of scale.

Broadly, the device for the treatment of fluids with magnetic lines of force in accordance with my U.S. Pat. No. 4,289,621, the entire disclosure of which is incorporated herein by reference, utilizes a non-ferromagnetic outer casing to magnetically isolate magnet assemblies disposed therein so that lines of magnetic force are concentrated to achieve maximum force fields at selected points. This is accomplished by providing at least three spaced-apart magnet assemblies positioned in the outer casing to form fluid passageways. Each magnet assembly comprises at least one tier of at least two permanent magnets, each encased in a non-ferromagnetic jacket and arranged coaxially with like poles of magnets in the same tier being adjacent each other. The jacketed magnets have their ends supported by ferromagnetic support members which are magnetized with the polarity of the magnet ends supported thereby and the length of each tier of magnets is supported between its ends by at least one support member adjacent the ends of the magnets received therein. The polarities of support members in one magnet assembly are unlike those of oppositely disposed support members in an adjacent assembly.

While the device of my U.S. Pat. No. 4,289,671 is highly effective and economical, it is limited as a practical matter by its construction to use in outer casings having internal diameters of about two inches or more. There remained the need for a device and associated method which would be operable in conduits having internal diameters substantially less than two inches and for a device which is even more economical in construction and use. This was accomplished by the device and method of my U.S. Pat. No. 4,417,984, the entire disclosure of which is incorporated herein by reference.

Broadly, the device of my U.S. Pat. No. 4,417,984 differs from that of my U.S. Pat. No. 4,289,671 in containing only a minimum of two spaced-apart magnet assemblies. It was further found that other features of the device of my U.S. Pat. No. 4,289,621, while still preferred, are not essential for successful operation of the device. More particularly, it was found that it is not essential that the outer casing be non-ferromagnetic, that each magnet in a magnet assembly be encased in a non-ferromagnetic jacket, or that the length of each tier of magnets be supported between its ends by the means described and claimed in said patent.

Finally, it was found not to be essential that each tier contains a plurality of individual permanent magnets. As will be more fully explained hereinafter, one or more tiers may comprise a single elongated permanent magnet magnetized along its longitudinal axis to provide a plurality of longitudinally spaced poles or polar ends of alternating polarity which define at least two magnetic sections extending transversely throughout the magnet.

All of the foregong differences and distinctions are incorporated in the device of my U.S. Pat. No. 4,417,984. There still remains, however, a need for a device having increased internal structural strength which is suitable for use in industrial applications and particularly those in which highly abrasive fluids are utilized. Such industrial applications include down-hole oil drilling and down-hole injection systems.

It is therefore a primary object of the present invention to provide further embodiments of my improved devices and associated methods for the treatment of fluids with magnetic lines of force wherein the device exhibits high internal structural strength.

It is another object of the present invention to provide such devices and associated methods which may be used in industrial applications in which highly abrasive fluids are utilized.

It has now been found that the above objects may be attained by a device containing a core magnet assembly and one or more concentric ring magnet assemblies.

Broadly, the device and associated method for the treatment of fluids with magnetic lines of force in accordance with the present invention utilize concentric but separate and magnetically isolated magnet assemblies comprising a core magnet assembly and one or more ring magnet assemblies and defining one or more substantially annular fluid passageways therebetween whereby lines of magnetic force are concentrated in said passageways to achieve up to maximum force fields at selected points.

There are two distinct magnetic force fields generated by the devices of my inventions including that of the present invention. The minor force field is radial and is inherent in elongated and particularly in cylindrical magnets, i.e., a N/S attraction for each individual magnet. The primary magnetic force fields, on the other hand, are generated by the polarities of adjacent polar ends of magnets or poles of magnetic sections in one magnet assembly being unlike the polarities of oppositely disposed polar ends of magnets or poles of magnetic sections in a parallel and spaced-apart magnet assembly positioned in the device. There are thus generated numerous high flux lines of magnetic force throughout the device which are concentrated at force field contraction points to intersect the aqueous liquid or other fluid flowing therethrough. Preferably, the aqueous liquid or other fluid passes through the device in substantially laminar flow in at least one substantially annular passageway whereby it intersects these primary high flux lines of magnetic force or force field contraction points at substantially right angles.

The device of the present invention provides adjacent high flux lines of magnetic force or force field contraction points of unlike or reversed polarity whereby said contraction points present reversed magnetic lines of force between adjacent magnet sections of the device. This results in dipole realignment which causes added excitation of the microscopic nucleating centers within the fluid resulting in the attraction and alignment of like compounds and, when the fluid is a liquid, reduces their solubility therein. These induced energy characteristics within a super-saturated solution stimulate the microscopic nucleating centers therein and attract like compounds, thus altering their energy potential. The resulting charged and coagulated impurities remain in the flowing stream and (depending on the increase in temperature) refuse to adhere to any surface contacted by the stream. Multiple excitation and molecular realignment points are provided to accelerate the nucleating process. It has been found, in addition, that use of the device and method of the present invention tends to reduce or eliminate scale earlier deposited on surfaces contacted by the treated stream of fluid.

The present invention is further illustrated with reference to the annexed drawing wherein:

FIG. 1 is a longitudinal sectional view, with parts removed for the purpose of clarity, of a fluid treatment device in accordance with the present invention showing the inner structure thereof;

FIG. 2 is a cross-sectional view taken along line 2—2 of FIG. 1 and viewed in the direction of the arrows;

FIG. 3 is a perspective and exploded view of the inner structure of the device of FIGS. 1 and 2 illustrating the structure and arrangement of the core and ring magnet assemblies therein;

FIG. 4 is a sectional view showing arrangement of the magnet within its support member in the core magnet assembly of FIG. 3.

FIGS. 4A, 4B and 4C are sectional views similar to FIG. 4 showing arrangement of a plurality of magnets in their support members in core magnet assemblies of other embodiments of the present invention;

Figure 5:
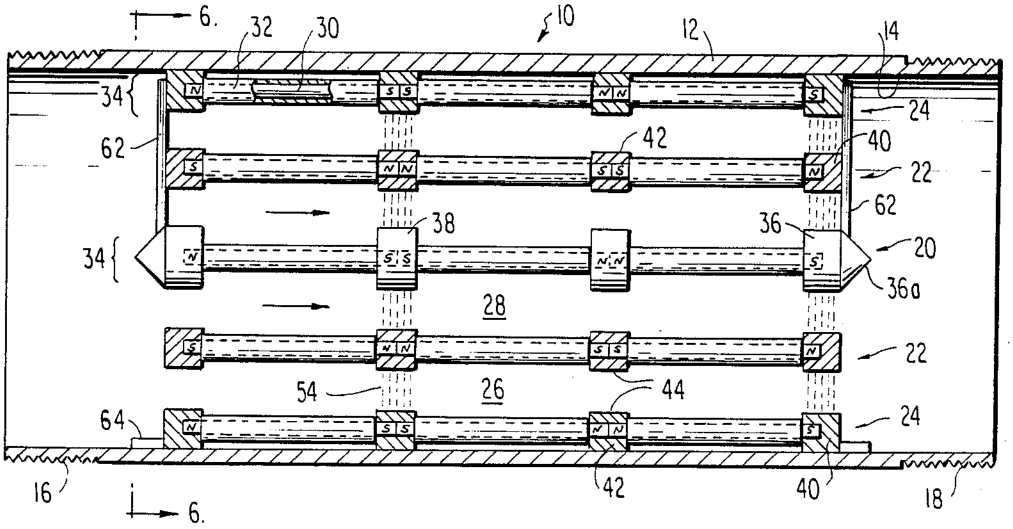
FIG. 5 is a longitudinal sectional view similar to FIG. 1 of another embodiment of the device of the present invention.
Figure 6:
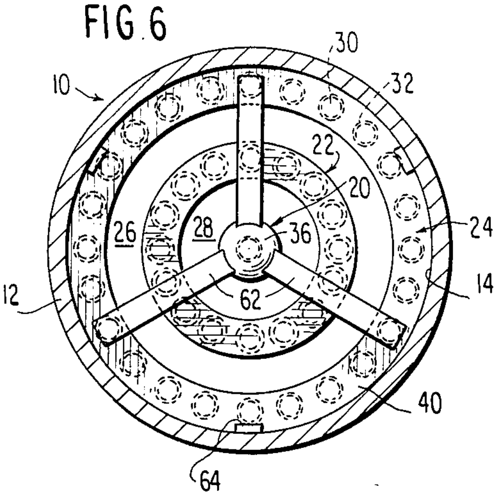
FIG. 6 is a cross-sectional view taken along lines 6—6 of FIG. 5 and viewed in the direction of the arrows.
Figure 9:
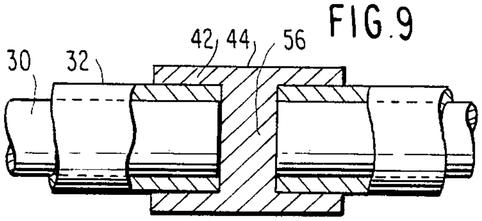
FIGS. 9 and 10 are enlarged fragmentary cross-sectional views of modified arrangements of the magnets within their jackets and support members.

In the drawing, the embodiment shown in FIGS. 5 and 6 differs from that shown in FIGS. 1-4 primarily in the presence of two ring magnet assemblies. This and other differences will be described in detail.

Referring to the drawing and particularly to the embodiments of FIGS. 1-6, the fluid treating device 10 comprises an elongated hollow outer casing 12 having an inner surface 14. Casing 12 may be terminated at each end thereof by threaded end fittings 16 and 18 which define inlet and outlet openings for the entrance of fluid to be treated into device 10 and the exit of treated fluid therefrom. It is to be understood that threaded end fittings 16 and 18 are illustrative only and may be replaced by equivalent end fittings such as flanged end fittings, dresser couplings, victualic couplings, oil field fittings or the like which will provide a fluid tight seal with a conduit (not shown) which serves to feed fluid to be treated to device 10 and carry treated fluid therefrom. Outer casing 12 may preferably be formed of a non-ferromagnetic material such as 300 Series Stainless Steel or other non-ferromagnetic metallic or polymeric material. Alternatively, casing 12 may be formed of a ferromagnetic material such as cold steel, wrought iron or the like. However, this will tend to result in a moderate reduction in concentration of the flux lines of magnetic force in the outermost fluid passageway due to the close proximity of the ferromagnetic casing to the ring magnet assembly adjacent thereto. As a consequence, a portion of the flux lines of force inherent in the magnets or magnetic sections will tend to be attracted to the casing. Thus outer casings of a non-ferromagnetic material are preferred.

Within casing 12 are positioned spaced-apart central or core magnet assembly, generally 20, and one or more concentric ring magnet assemblies, generally 22, 24, each being coextensive in length and having a longitudinal axis substantially parallel with the longitudinal axis of casing 12 and with one another to define substantially annular passageways 26, 28 therebetween for the flow of fluid therethrough. Although the flow of fluids is shown by arrows to go from left to right in FIG. 1, it is to be understood that said flow may be from right to left if desired. Each magnet assembly contains a plurality of permanent magnets 30 which are formed from a material having high flux density and high retentivity, for example, a rare earth, barium titanate, a ferrite compound such as barium ferrite, an alnico and the like, and magnetized along a given path therein as is well known in the art. In the embodiments shown in FIGS. 1–9, each magnet 30 is cylindrical and is magnetized along its longitudinal axis. When desired, magnets 30 may be encased in a non-ferromagnetic jacket 32 (FIGS. 5–8) which may be formed of a non-ferromagnetic material, i.e., a metal such as 300 series stainless steel, brass or copper or the like or a polymeric material, such as rigid polyvinyl chloride, which is hard and wear-resistant, or the like.

Core magnet assembly 20 in FIGS. 1–6 comprises at least one tier 34 of at least two magnets 30 arranged in a coaxial line with the magnets in the same tier having like poles adjacent to each other, i.e., in N—S and S—N relationship. Ring magnet assemblies 22, 24 comprise a plurality of adjacent tiers 34 as necessary to form one or more substantially annular concentric rings about core assembly 20. The polarity at one end of each tier 34 of magnets and, therefore, of each magnet assembly 20, 22 and 24, may be either like or unlike the polarity at the other end thereof, depending on whether there is an odd or even number of at least two magnets 30 in each tier 34. In the embodiments shown in FIGS. 1–6, core magnet assembly 20 contains one tier 34 of magnets 30. In the embodiment of FIGS. 1–4, ring magnet assembly 24 contains 16 said tiers whereas in the embodiment of FIGS. 5 and 6, ring magnet assembly 22 contains 16 said tiers and ring magnet assembly 24 contains 24 said tiers. It is to be understood that while the devices of the present invention as shown in FIGS. 1–6 comprise core magnet assembly 20 containing one tier 34 of three magnets 30, core magnet assemblies containing a plurality of tiers 34 as will be more fully explained hereinafter with regard to FIGS. 4A, 4B and 4C, are contemplated within the scope of the invention. Similarly, devices containing more than two ring magnet assemblies are contemplated, the number of rings being controlled by considerations of size and expense of the completed device and by the contemplated use for the device. For example, it is within the scope of the present invention to provide devices containing up to 15 or more ring magnet assemblies. A device containing 15 such assemblies can be carried in an outer casing having an internal diameter of 60 inches.

While in the preferred embodiments shown, tiers 34 in ring magnet assemblies 22 and 24 are closely adjacent to or abut one another, it is to be understood that this arrangement is not essential. For certain uses for the device of the present invention, and particularly when core magnet assembly 20 contains a single tier 34 of magnets 30, one or more of ring magnet assemblies 22 and 24 may contain as few as two, three, four, or more tiers 34 of magnets 30, said tiers being spaced substantially equidistant from one another in said ring magnet assembly. In a still further embodiment, the total number of magnets 30 contained in each magnetic section in one or more of ring magnet assemblies 22 or 24 may be replaced by a single magnet, not shown, substantially in the shape of a hollow cylinder, held in support members 36, 38, 40 and 42 and which may, if desired, be encased in a non-ferromagnetic jacket.

In core magnet assembly 20, the polar ends of magnets 30 are supported in inlet and outlet end support members 36 and internal support members 38. In ring magnet assemblies 22, 24, the polar ends of magnets 30 are supported in annular inlet and outlet end support members 40 and internal support members 42. End support members 36 and 40 and particularly internal support members 38 and 42 may be formed of a ferromagnetic material such as cold steel, wrought iron or the like, and thus are magnetized by the magnets. In the alternative, end support members 36 and 40 and even internal support members 38 and 42 may be formed of a non-ferromagnetic material such as discussed above with relation to the preferred embodiment of outer casing 12. When a support member is non-ferromagnetic it is not magnetized by the polar ends of magnets received therein. In this case, when the length, i.e. the distance between the polar ends of a given magnet, one of whose ends is received in a non-ferromagnetic support member, is greater than the distance between the ends of said given magnet and the ends of a magnet received in the oppositely disposed support member in an adjacent magnet assembly, the device is still effective for the magnetic treatment of fluids since the primary magnetic field generated by the magnet ends received in the spaced-apart magnet supports as discussed above is greater than the minor radial force field inherent between the ends of each magnet. With reference to FIG. 1, the ratio between the length of magnet 30 and the distance between magnet ends 30*a* and 30*b* or between magnet ends 30*b* and 30*c*, is within the scope of about 2:1 to 10:1 or more, preferably about 3:1 to 6:1, with a ratio of about 4:1 being highly preferred.

Core magnet assembly support members 36 and 38 are shown in the drawing as being circular in cross-section with a disc-like shape and end support members 36 as having integral cone-shaped projections 36*a* extending outwardly of magnet assembly 20. However, other shapes may be used, i.e., support members 36 and 38 may be hexagonal, rectangular, triangular, square, etc. in cross-section, and cone-shaped or otherwise tapered projections 36*a* although preferred may be omitted. Ring magnet assembly support members 40 and 42 are shown in FIG. 1 of the drawing as square in cross-section and in FIG. 2 as substantially conforming to the internal curvature of outercasing 12 and substantially in the shape of a ring. Again, other shapes can be used, i.e., the members may be substantially cylindrical, hexagonal, rectangular, triangular, etc. in cross-section, may be of any desired shape to conform to the internal dimension of outercasing 12 and may carry beveled or otherwise tapered surfaces if desired. Optional beveled surfaces 46 are shown in FIG. 1. In addition, each of ring magnet assemblies 22, 24 may, if desired, be formed of two or more individual segments, each supporting the polar ends of one or more magnets 30. The segments may abut one another or may be spaced apart and joined by means known to the art.

Preferably, the surfaces 44 of each end support member 36 of magnet assembly 20 and the facing surfaces 44 of the oppositely disposed end support members 40 of adjacent magnet assembly 22, 24 are free of roughness or irregularity and substantially conform in dimension and shape to one another. In a further embodiment, surfaces 44 of all of support members 36, 38, 40 and 42 have this configuration. It is to be understood, however, that any one surface 44 may vary in shape and dimension from the facing surface 44 of an oppositely disposed support member.

Figure 7:
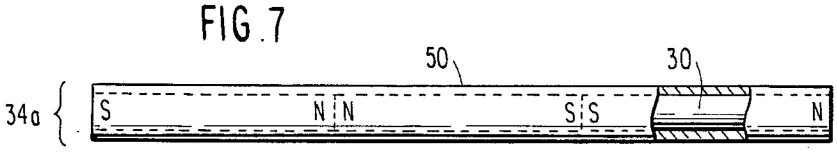
FIG. 7 is a side view, partly in section, of the arrangement of magnets in a modified tier thereof.

Referring now particularly to the embodiment of FIG. 7, there is shown tier 34*a* comprising a plurality of permanent magnets 30 arranged in coaxial line and encased in a non-ferromagnetic sleeve 50 which may be formed of the same material as that described above for jacket 32. Tiers 34 in FIGS. 1–6 may, if desired, be replaced by tiers 34*a*, in which instance internal support members 38 and 42 may be omitted since the individual magnets 30 and thus the length of each tier 34*a* is fully suported in sleeve 50 which, in turn, is supported by end suport members 36 or 40. In the instance when said end support members are non-ferromagnetic, the ratio between the length of each magnet 30 and the distance between magnet ends (e.g. between ends 30*a* and 30*b* or between ends 30*b* and 30*c* in FIG. 1), within the scope of about 2:1 to 10:1 or more, preferably about 3:1 to 6:1, with a ratio of about 4:1 being highly preferred.

Figure 8:
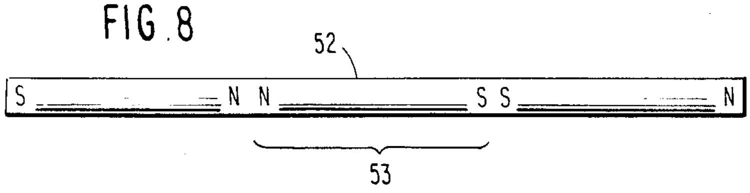
FIG. 8 is a side view of a single elongated magnet having a plurality of magnetic sections therein which may be used in the devices of FIGS. 1-6.

Referring now particularly to FIG. 8, there is shown a single elongated permanent magnet 52 having a substantially homogeneous composition such as that of magnet 30 and magnetized along its longitudinal axis to provide a plurality of longitudinaly spaced poles or polar ends of alternating polarity designated by the letters "N" and "S". In the embodiment shown, magnet 52 comprises four longitudinally spaced poles or polar ends which define three magnetic sections 53 extending transversely throughout the magnet. Sections 53 have their magnetic polarities or polar ends alternately and oppositely aligned whereby alternating north and south poles are provided in the magnet. This type of magnet may be produced by imposing a plurality of longitudinally displaced static magnetic fields of alternating polarity on a single length, e.g. a single bar, of magnetic material. For use in the device of the present invention, magnet 52 will contain at least three spaced poles or polar ends of alternating polarity to provide at least two magnetic sections 53. The polarity at one end of magnet 52 may be either like or unlike the polarity at the other end thereof depending on whether there is an odd or even number of magnetic sections 53 provided therein, and may be either "N" or "S".

With regard to the device shown in FIGS. 1–4, the magnets 30 in a single tier 34 may be replaced by a single magnet 52. Similarly, in the embodiments shown in FIGS. 5–7, magnets 30 in a single tier 34 may be replaced by a single magnet 52, and jackets 32 or sleeve 50 may be omitted, if desired. In the instance when a support member 36 or 40 is formed of a non-ferromagnetic material, the length of a magnetic section 53 of magnet 52 in one magnet assembly, e.g. 20, will be greater by a ratio of betwen about 2:1 to about 10:1 or more, preferably about 3:1 to 6:1, most preferably about 4:1, than the distance between the polar ends of said magnetic section and the polar ends of a magnetic section received in the oppositely disposed support member in an adjacent magnet assembly, e.g. 22.

Core magnet assembly 20 is shown in FIGS. 1–6 as containing one tier 34 or 34*a* of magnets 30 or magnet 52. FIG. 4 illustrates the preferred arrangement of magnet 30 within support member 38. It is to be understood that core magnet assembly 20 may contain a plurality of tiers of magnets. FIGS. 4A, 4B and 4C show preferred arrangements of magnets 30 in support member 38 when two, three or four magnets, respectively, are provided.

The number of tiers of magnets or magnetic sections in each core and ring magnet assembly and the number of ring magnet assemblies in a device will be dependent, inter alia, on the shape and dimension of the magnets and support members, and the inner diameter of the outer casing. The number of magnets in each magnet assembly will be dependent, inter alia, upon the identity of the fluid being treated, the concentration of impurities contained in the fluid, and the physical characteristics of the fluid, e.g., viscosity, dielectric constant, etc. The magnet asssemblies in the embodiments shown in FIGS. 5 and 6, for example, can be receieved in an outer casing having an internal diameter of about 8 inches or less. However, it is within the scope of the present invention to provide outer casings 12 having diameters of up to about sixty inches or more.

Each end support member 36 and 40 is shown in the drawing as counter-bored to receive and support the polar end of a single magnet 30 or 52 and, if used, jacket 32 or sleeve 50 and the internal support members 38 and 42 are through-bored to receive and support abutting or contiguous like poles of adjacent magnets 30 or polar ends of the magnetic sections 53 of magnets 52. When support members 36, 38, 40 or 42 are ferromagnetic they are magnetized with the polarity of the polar ends of magnets 30 or magnetic sections 53 of magnets 52 received therein and the magnetic energy is distributed to surfaces 44. This results in a maximum concentration of the lines of magnetic force at said surfaces 44 which become force field contraction points to achieve maximum force fields 54 between oppositely disposed support members 36 and 40 or support members 38 and 42 of adjacent magnet assemblies. On the other hand, when support members 36, 38, 40 or 42 are non-ferromagnetic, they are not magnetized by the magnets received therein. However, force fields 54 are still produced, although of somewhat reduced energy, by the close proximity of the oppositely disposed magnet ends in support members in adjacent magnet assemblies. Similarly, in the embodiments when tiers 34 of magnet assemblies 20, 22 and 24 are replaced by tiers 34*a* (FIG. 7) or elongated permanent magnet 52 (FIG. 8), force fields 54 are produced by the close proximity of the adjacent polar ends of magnets 30 or magnetic sections 53 of magnets 52 in said magnet assemblies.

It is to be understood that other equivalent means may be provided to adapt support members 36, 38, 40 and 42 to receive magnets 30 or 52 and, when used, jackets 32 or sleeve 50 therein so long as the polar ends of magnets 30 or 52 are in efficient magnetic field termination with said support members or with adjacent polar ends of magnets or magnetic sections within said support members, e.g. routing of the support members, ground jointing of the magnets with the support members, etc. Other preferred means to achieve efficient magnetic field terminaton are more fully discussed hereinafter.

Figure 10:
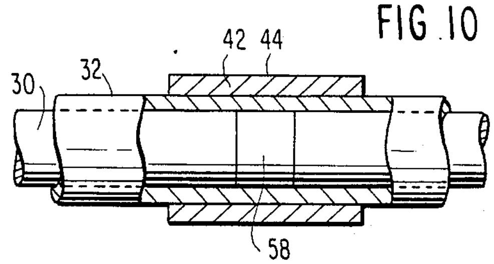

In the embodiment shown in FIGS. 1–6, magnets 30 in each tier 34 are contiguous. In the embodiment shown in FIG. 9, magnets 30 and jackets 32 are terminated with like magnet poles of magnets 30 received in opposed counter-bores in an internal support member 42 leaving portion 56 of internal support member 42 lying between and contiguous with the polar ends of magnets 30. The arrangement shown in FIG. 9 results in a most effective manner for uniformly distributing magnetic energy, i.e. magnetic lines of force, from the polar ends of magnets 30 to the surfaces 44 of support members 42. In the further embodiment shown in FIG. 10, support member 42 is through-bored and receives jacket 32 within which like magnet polar ends of magnets 30 are separated by a contiguous spacer 58 formed of a ferromagnetic material such as cold steel, wrought iron, etc. Spacer 58 also serves to uniformly distribute the magnetic energy from the polar ends of magnets 30 to surfaces 44 as described above. Any of these three arrangements of polar ends of magnets 30 with or without jackets 32 within internal support members 42 may be utilized in the devices shown in FIGS. 1–6 as may other arrangements as discussed above which are effective in uniformly distributing magnetic energy from magnets 30 to surfaces 44. Moreover, any of these arrangements may be used in internal support members 38 in ring magnet assemblies 22 and 24.

In the embodiment of FIG. 7, magnets 30 in tier 34*a* are also shown as contiguous within sleeve 50. However, similarly to the modification shown in FIGS. 1–6, like polar ends of magnets 30 may be separated by contiguous spacer 58 formed of a ferromagnetic material.

Magnet assemblies 20 and 24 shown in FIGS. 1–3 and magnet assemblies 20, 22 and 24 shown in FIGS. 5 and 6 are assembled and positioned within outer casing 12 so that the polarity of each support member 36 and 38 of core magnet assembly 20 is unlike the polarity of the oppositely disposed support member 40 or 42 in an adjacent ring magnet assembly 22 or 24. Similarly, the polarity of each support member 40 and 42 of any ring magnet assembly 22 or 24 is unlike the polarity of the oppositely disposed support member 40 or 42 of an adjacent ring magnet assembly. As seen in FIG. 1, the polarity of any given support member 36 or 38 in core magnet assembly 20 is unlike the polarity of the oppositely disposed support member 40 or 42 in ring magnet assembly 24. Similarly, as seen in FIG. 5, the polarity of any given support member 40 or 42 in ring magnet assembly 22 is unlike the polarity of the oppositely disposed support member 36 or 38 of core magnet assembly 20 and also unlike the polarity of the oppositely disposed support member 40 or 42 in ring magnet assembly 24. Magnet assemblies comprising tiers 34*a* (FIG. 7) or elongated permanent magnet 52 (FIG. 8) may be assemblied and positioned within outer casing 12 in a similar manner whereby the polarity of each end support member 36 or 40 and of each set of adjacent polar ends of magnets 30 or magnetic sections 53 of magnets 52 in any one of said magnet assemblies, e.g., 20, is unlike the polarity of the oppositely disposed end support member 36 or 40 or set of adjacent polar ends of magnets 30 or magnetic sections 53 of magnets 52 in an adjacent magnet assembly, e.g., 22.

Means are provided for magnetically isolating magnet assemblies 20, 22 and 24 from one another. As seen in FIGS. 1, 2 and 3, separating spacers 60 which are formed of a non-ferromagnetic metal such as copper, brass, 300 Series Stainless Steel and the like, or other non-ferromagnetic material of sufficient strength, are fixedly attached to oppositely disposed support members 36, 40 and 38, 42 of the magnet assemblies whereby said support members and magnet assemblies are spaced apart. The attachment may be achieved by any known means such as welding, brazing or the like. As seen in FIGS. 2 and 3, end support members 36 and 40 are isolated by 3 separating spacers 60 at approximately 120° angles from one another. This is considered a preferred minimum number as a practical matter although fewer, e.g. 2, or more spacers 60 may be used if desired. Moreover, if desired, one or more spacers 60 may be omitted from between internal support members 38 and 42.

In the embodiment shown in FIGS. 5 and 6, magnetic isolation is achieved by separating plates 62 formed of the same non-ferromagnetic material as spacers 60. Plates 62 are fixedly attached to the inlet and outlet end surfaces of magnet assemblies 20, 22 and 24 by any known means. As seen in FIG. 6, end support members 36 and 40 of magnet assemblies 20, 22 and 24 are isolated by 3 separating plates 62 although more may be used if desired. Moreover, if desired for added strength, separating spacers 60, not shown, may be used between one or more sets of opposing internal support members 38 and 42 shown in FIG. 5.

As seen in FIGS. 1–6, support members 40 and 42 of ring magnet assembly 24 are contiguous with inner surface 14 of outer casing 12 and may be attached thereto by any means known to the art. Alternatively, the outermost ring magnet assembly 24 may be spaced from outer casing 12. In the embodiments shown in FIGS. 1–6, the assembled magnetic devices of the present invention with magnet assemblies 20, 22 and 24 magneticaly isolated by separating spacers 60 or separating plates 62 are maintained in place and without movement in outer casing 12 by retaining plugs 64 fixedly attached to inner surface 14 thereof at the inlet and outlet ends of the devices. The number and spacing of retaining plugs 64 may be varied according to the size and number of magnet assemblies disposed within the outer casing.

In a further embodiment, retaining plugs 64 may be replaced by a unitary or segmented retaining ring, not shown. If desired, separating plates 62 at either or both of the inlet and outlet surfaces of the magnet assemblies may be replaced by a single transverse separating end piece or bar, not shown, which may be fixedly attached to the outer casing and may be notched if necessary to accommodate tapered projection 36*a*. In this instance, separating spacers 60 and/or separating plates 62 may be omitted.

The spacing between magnet assemblies 20, 22 and 24 and, where applicable, between the assemblied device and outer casing 12 may be varied within certain criteria. It is important that the opposing surfaces 44 or opposing magnet or magnetic section ends in adjacent magnet assemblies be sufficiently near one another that the force fields therebetween remain effective for the intended purpose and that the fluids passing through passageways 26 and 28 be sufficiently confined. It is also important, however, that sufficient flow of fluid through the device be maintained to prevent too high or severe a pressure drop.

In the device and method of the present invention when outer casing 12 is ferromagnetic and/or magnets 30 or 52 are not encased in non-ferromagnetic jackets 32 or sleeve 50, and/or support members 36, 38, 40 and/or 42 are non-ferromagnetic and/or the length of each tier 34 of magnets 30 or magnet 52 is supported between its ends by sleeve 50 rather than internal suport members 38 and 42, the efficiency may be somewhat diminished. To increase efficiency, a greater number of magnets, or tiers of magnets or of magnet assemblies may be used. In the alternative or in addition, outer casing 12 may be made non-ferromagnetic and/or magnets 30 or 52 may be encased in non-ferromagnetic jackets 32 or sleeve 50 and/or end support members 36 and/or 40 may be made ferromagnetic and/or the length of each tier 34 of magnets may be supported by internal support members 38 and/or 42. One or more of these expedients may be used depending on the increase in efficiency desired and the particulars of the system in which the device is to be incorporated.

Optionally and preferably, magnet assemblies 20, 22 and 24 are assembled with plates 62 or spacers 60 and this assembled magnet unit is treated to minimize or eliminate the effect of galvanic corrosion which might normally occur between dissimilar metals. This may be accomplished, for example, by spraying or dipping the assembled unit in a coating material such as zinc, an epoxy resin, an elastomer or any other suitable material. Following this, the assembled unit is affixed in outer casing 12 and again treated as described above as a completed device 10 to cover any imperfections which may occur during installation, for esthetic reasons or for adapting the device for use with a particular fluid. While in the drawing support members 40 and 42 are shown as abutting or in contiguous relation with inner surface 14 of outer casing 12, it is to be understood there will be a slight tolerance to allow for insertion of the assembled magnet unit into the casing prior to its being fixedly retained therein as described above.

It is within the scope of the present invention to provide the above-described assembled magnet unit for insertion and affixing into existing conduits and it is not essential that said units be used in combination with outer casing 12.

In operation, fluid to be treated is supplied to device 10 through a conduit, not shown. The fluid enters outer casing 12 and, when the fluid contacts device 10, it is directed into passageways 26 and 28 with their attendant force fields, thus altering the flow path of the fluid and promoting molecular alignment of compounds contained therein. As the resulting substantially annular flow of fluid traverses concentrated high flux intersects or force fields 54 of alternating N—S and S—N lines of magnetic force at substantially right angles, the microscopic nucleating centers are excited. This results in attraction and alignment of like compounds contained in the fluid and the formation of coagulated impurities which remain in the flowing stream.

Thus, the method for treatment of fluids with magnetic lines of force in accordance with the embodiments of FIGS. 1-6 comprises directing the fluid through at least one passageway defined by the spaced-apart and longitudinally coextensive magnet assemblies, each assembly comprising at least one tier of at least two permanent magnets arranged in coaxial line with like poles adjacent each other. The magnet assemblies are positioned so that the polarities of adjacent polar ends of magnets in one of said magnet assemblies are unlike the polarities of the oppositely disposed polar ends of magnets in a spaced-apart magnet assembly. Similarly, the method for treatment of fluids with magnetic lines of force in accordance with the embodiment wherein individual permanent magnets 30 have been replaced by the single permanent magnet 52 shown in FIG. 8 comprises directing the fluid through at least one passageway defined by the spaced-apart and longitudinally coextensive magnet assemblies, each assembly comprising at last one tier of at least one permanent magnet magnetized along its longitudinal axis to provide a plurality of longitudinally spaced poles of alternating polarity defining at least two magnetic sections in coaxial line in said tier. The magnet assemblies are positioned so that the polarities of the poles of the magnetic sections in one of said magnet assemblies are unlike the polarities of the oppositely disposed poles of magnetic sections in a spaced-apart magnet assembly.

Device 10 is preferably contained in a recirculating system with a boiler, heat exchanger or the like. As the fluid makes repeated passes through device 10, the amount of coagulated impurities will increase and may be removed from the system at any desired time. While the device of the present invention is especially suited for fluids such as calcareous aqueous liquids, the device may be modified for use with other liquids or with gases in related fields including hyperfiltration of effluents, oil and gas well drilling applications, crude oil collection systems, etc. The device is particularly useful in single pass systems wherein fluid conductivity, high impurity concentration and/or saturation conditions exist, e.g. in drilling fluid and salt water applications and the like.

In the foregoing description and throughout the specification and claims, the term "ferromagnetic" is used to describe materials having a high magnetic permeability and saturation point and which are attracted to a magnet, i.e. such materials as iron, nickel, cobalt, etc. In addition, it is to be understood that the annular configuration of ring magnet assemblies 22 and 24 may be modified to be an oval or an ellipse.

What is claimed is:

1. A device for the treatment of fluids with magnetic lines of force comprising:

at least one elongated core magnet assembly and at least one spaced-apart and longitudinally coextensive elongated ring magnet assembly, each said magnet assembly having a longitudinal axis substantially parallel with that of an adjacent magnet assembly to form at least one elongated passageway having fluid inlet and outlet ends for passage of said fluid therebetween;

each said magnet assembly comprising at least one tier of at least two coaxially aligned magnetic sections in each of at least one permanent magnet magnetized along its longitudinal axis with like polar ends of said magnetic sections adjacent each other, and with like polar ends of each said tier in each said magnet assembly being adjacent each other, thereby providing at least three spaced poles of alternating polarity in coaxial line in each said tier and in each said magnet assembly;

each said tier having one end supported by an inlet end support member and its other end supported by an outlet end support member;

said magnet assemblies being positioned so that the polarities of adjacent poles of magnetic sections in one said magnet assembly are unlike the polarities of the oppositely disposed adjacent poles of magnetic sections in a spaced-apart magnet assembly, thereby providing at least three concentrated flux lines of magnetic force and adjacent flux lines of reversed polarity in each said passageway.

2. The device according to claim 1 wherein each said tier comprises a single permanent magnet magnetized along its longitudinal axis to provide said spaced poles of alternating polarity.

3. The device according to claim 1 wherein each said tier comprises at least two permanent magnets, each magnetized along its longitudinal axis and arranged in coaxial line with the other magnet or magnets in said tier with like polar ends of said magnets adjacent each other to provide said spaced poles of alternating polarity.

4. A device for the treatment of fluids with magnetic lines of force comprising:

an elongated hollow outer casing having a longitudinal axis and fluid inlet and outlet means at the longitudinal ends thereof;

at least one elongated core magnet assembly and at least one spaced-apart and longitudinally coextensive elongated ring magnet assembly, each said magnet assembly positioned within said outer casing and having a longitudinal axis substantially parallel with that of an adjacent magnet assembly and with the longitudinal axis of said outer casing to form at least one elongated annular passageway for said fluid therebetween;

each said magnet assembly comprising at least one tier of at least two coaxially aligned magnetic sections in each of at least one permanent magnet magnetized along its longitudinal axis with like polar ends of said magnetic sections adjacent each other, and with like polar ends of each said tier in each said magnet assembly being adjacent each other to provide at least three spaced poles of alternating polarity in coaxial line in each said tier and in each said magnet assembly;

each said tier having one end supported by an inlet end support member and its other end supported by an outlet end support member;

said magnet assemblies being positioned so that the polarities of adjacent poles of magnetic sections in one said magnet assembly are unlike the polarities of the oppositely disposed adjacent poles of magnetic sections in a spaced-apart magnet assembly, thereby providing at least three concentrated flux lines of magnetic force and adjacent flux lines of reversed polarity in each said passageway; and means for fixedly positioning said magnet assemblies within said outer casing.

5. The device according to claim 4 wherein each said tier comprises a single permanent magnet magnetized along its longitudinal axis to provide said spaced poles of alternating polarity.

6. The device according to claim 4 wherein the outer casing is non-ferromagnetic.

7. The device according to claim 4 wherein each magnet is encased in a non-ferromagnetic jacket.

8. The device according to claim 4 wherein the length of each tier of magnetic sections is supported between its ends by means associated with said end support members.

9. The device according to claim 4 wherein each said end support member is ferromagnetic whereby each is magnetized with the polarity of the magnet ends supported thereby.

10. The device according to claim 4 wherein each said end support member is non-ferromagnetic and wherein the distance between the ends of a magnet received in one said non-ferromagnetic support member is greater than the distance between said magnet ends and the magnet ends received in the oppositely disposed support member in an adjacent magnet assembly.

11. The device according to claim 4 wherein each said tier comprises at least two permanent magnets, each magnetized along its longitudinal axis and arranged in coaxial line with the other magnet or magnets in said tier with like polar ends of said magnets adjacent each other to provide said spaced poles of alternating polarity.

12. The device according to claim 11 wherein the length of said tier is supported by a sleeve encasing the magnets therein and operatively associated with said end support members.

13. The device according to claim 11 wherein the length of each tier of magnets is supported between its ends by at least one internal support member adjacent the polar ends of the magnets received therein.

14. The device according to claim 13 wherein each said internal support member is ferromagnetic whereby it is magnetized with the polarity of the magnet ends supported thereby.

15. The device according to claim 13 wherein said internal support member is adapted to receive and support like poles of adjacent magnets with a portion of said internal support member lying between and contiguous with the polar ends of said magnets.

16. The device according to claim 13, wherein said internal support member is adapted to receive and support like poles of adjacent magnets with a ferromagnetic spacer positioned between and contiguous with the polar ends of said magnets.

17. The device according to claim 4 wherein each said tier contains at least three magnetic sections.

18. The device according to claim 4, wherein said permanent magnets are cylindrical in shape.

19. The device according to claim 4, wherein each ring magnet assembly contains at least two said tiers spaced substantially equidistant from one another therein.

* * * * *